(12) United States Patent
Yamada et al.

(10) Patent No.: US 8,517,266 B2
(45) Date of Patent: Aug. 27, 2013

(54) CHECKOUT TERMINAL AND CONTROL METHOD FOR THE SAME

(75) Inventors: Yoshiya Yamada, Shizuoka (JP); Hitoshi Iizaka, Shizuoka (JP); Hidemi Mihara, Shizuoka (JP); Hidehiro Naito, Shizuoka (JP); Osamu Tsuchiya, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 19 days.

(21) Appl. No.: 13/081,812

(22) Filed: Apr. 7, 2011

(65) Prior Publication Data

US 2011/0259952 A1 Oct. 27, 2011

(30) Foreign Application Priority Data

Apr. 21, 2010 (JP) .................................. 2010-098107

(51) Int. Cl.
*G06K 15/00* (2006.01)
(52) U.S. Cl.
USPC .......................................................... 235/383
(58) Field of Classification Search
USPC ..................... 235/379, 385, 383; 705/16, 23; 177/50
See application file for complete search history.

(56) References Cited

U.S. PATENT DOCUMENTS

| | | | | |
|---|---|---|---|---|
| 4,787,467 A | * | 11/1988 | Johnson | 177/50 |
| 5,125,465 A | * | 6/1992 | Schneider | 177/50 |
| 5,424,524 A | * | 6/1995 | Ruppert et al. | 705/17 |

FOREIGN PATENT DOCUMENTS

| | | |
|---|---|---|
| JP | 01-246680 | 10/1989 |
| JP | 04-127391 | 4/1992 |
| JP | 2007-072560 | 3/2007 |
| JP | 2008-059502 | 3/2008 |
| JP | 2008-059503 | 3/2008 |
| JP | 2009-176037 | 8/2009 |

OTHER PUBLICATIONS

Japanese Office Action for Japanese Application No. 2010-098107 mailed on Apr. 17, 2012.

* cited by examiner

*Primary Examiner* — Jamara Franklin
(74) *Attorney, Agent, or Firm* — Turocy & Watson, LLP

(57) ABSTRACT

According to one embodiment, a checkout terminal includes a lighting unit, a detection unit, a weighing unit, a reading unit, a determination unit, a storage control unit, and a lighting control unit. The lighting unit illuminates an article. The detection unit detects an article code from the article. The weighing unit measures a weight of the article. The reading unit reads out weight information and article information of the article. The determination unit determines whether or not the weight measured by the weighing unit is identical with the weight indicated by the weight information. The storage control unit stores the article information in a second storage unit, when it is determined by the determination unit that the weights are identical. The lighting control unit controls the lighting unit so as to be turned off when it is determined by the determination unit that the weights are not identical.

6 Claims, 9 Drawing Sheets

| Article code | Check flag (F) | Preset weight (g) | Margin of error (g) |
|---|---|---|---|
| 4900000000016 | 1 : Yes | 100 | 10 |
| 4900000000025 | 1 : Yes | 50 | 10 |
| 4900000000047 | 1 : Yes | 170 | 20 |
| 4900000000086 | 1 : Yes | 250 | 30 |
| 2110000000017 | 0 : No | - | - |

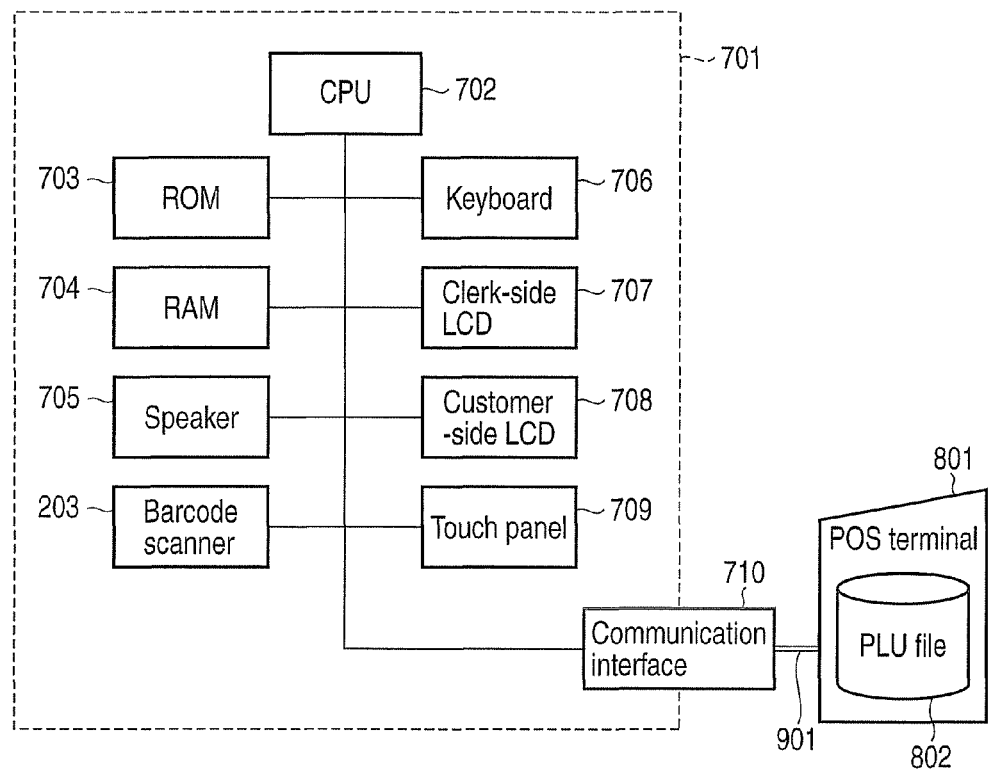
F I G. 1 3

CHECKOUT TERMINAL AND CONTROL METHOD FOR THE SAME

CROSS-REFERENCE TO RELATED APPLICATION

This application is based upon and claims the benefit of priority from the prior Japanese Patent Application No. 2010-098107, filed on Apr. 21, 2010, the entire contents of which are incorporated herein by reference.

FIELD

Embodiments described herein relate generally to a checkout terminal which a customer operates by himself or herself to conclude a series of accounting operations, and a control method for the same.

BACKGROUND

Recently, the development of a self-checkout terminal having various interfaces in order to allow a customer to complete payment of articles by himself or herself is under way. In the case of carrying out payment using a terminal of this type, a customer as an operator causes a barcode scanner provided on the terminal to read a barcode attached to an article and thus inputs an article code. On the terminal side, the price is calculated based on the inputted article code and the calculated price is displayed on a display unit. The customer pays the price displayed on the display unit by cash, card, electronic money or the like, using an interface for payment of price, and complete a series of payment processes.

In the case of payment for articles using the self-checkout terminal, a measure needs to be taken to limit articles which the customer can take home to articles whose article codes are inputted already, in order to prevent unauthorized acts. An example of such measure is checking the weight of articles whose article codes are inputted already. That is, the weight of an article whose article code is inputted already is measured, and this weight is compared with the weight of the same article specified in a FLU (price lookup) file or like, based on the article code. When the two weights are not identical, this situation is regarded as a weighing error. When a weighing error is generated, an error message and guidance on an error cancellation method are displayed on a display unit and so on, thus notifying the customer of the generation of the weighing error.

When the weighing error is generated by weight check as described above, the operator of the self-checkout terminal may input the next article code without noticing the error message displayed on the display unit. In this case, it is difficult for the operator who notices the weighing error to confirm which article this weighing error is about.

Also, in an ordinary checkout system where a clerk operates a POS (point of sales) terminal or the like to complete a series of payment processes, despite failure to read correctly an article code attached to an article, the next article code may be inputted. In such case, the clerk does not understand which article's barcode fails to be read correctly and it takes time to cope with this situation. Therefore, the payment is delayed. Moreover, the customer has to wait, which can damage the impression of the store.

BRIEF DESCRIPTION OF THE DRAWINGS

FIG. 13 shows the general configuration or the like of a system according to a second embodiment.

DETAILED DESCRIPTION

In general, according to one embodiment, a checkout terminal includes a lighting unit, a detection unit, a placing table, a weighing unit, a reading unit, a determination unit, a storage control unit, and a lighting control unit. The lighting unit illuminates an article. The detection unit detects an article code from the article illuminated by the lighting unit. The placing table has the article placed thereon. The weighing unit measures a weight of the article placed on the placing table. The reading unit reads out, from a first storage unit in which weight information including information indicating a weight of an article and article information are stored for each article, the weight information and the article information of the article indicated by the article code detected by the detection unit. The determination unit determines whether or not the weight measured by the weighing unit after the article code is detected by the detection unit is identical with the weight indicated by the weight information read out by the reading unit. The storage control unit stores the article information read out by the reading unit in a second storage unit for storing article information of an article as a payment target, when it is determined by the determination unit that the weights are identical. The lighting control unit controls the lighting unit so as to be turned off when it is determined by the determination unit that the weights are not identical.

Hereinafter, several embodiments will be described with reference to the drawings.

First Embodiment

In a first embodiment, an example of a so-called self-checkout terminal with which a series of payment processes is completed by operation of a customer by himself or herself will be described.

System Configuration

Figure 1:
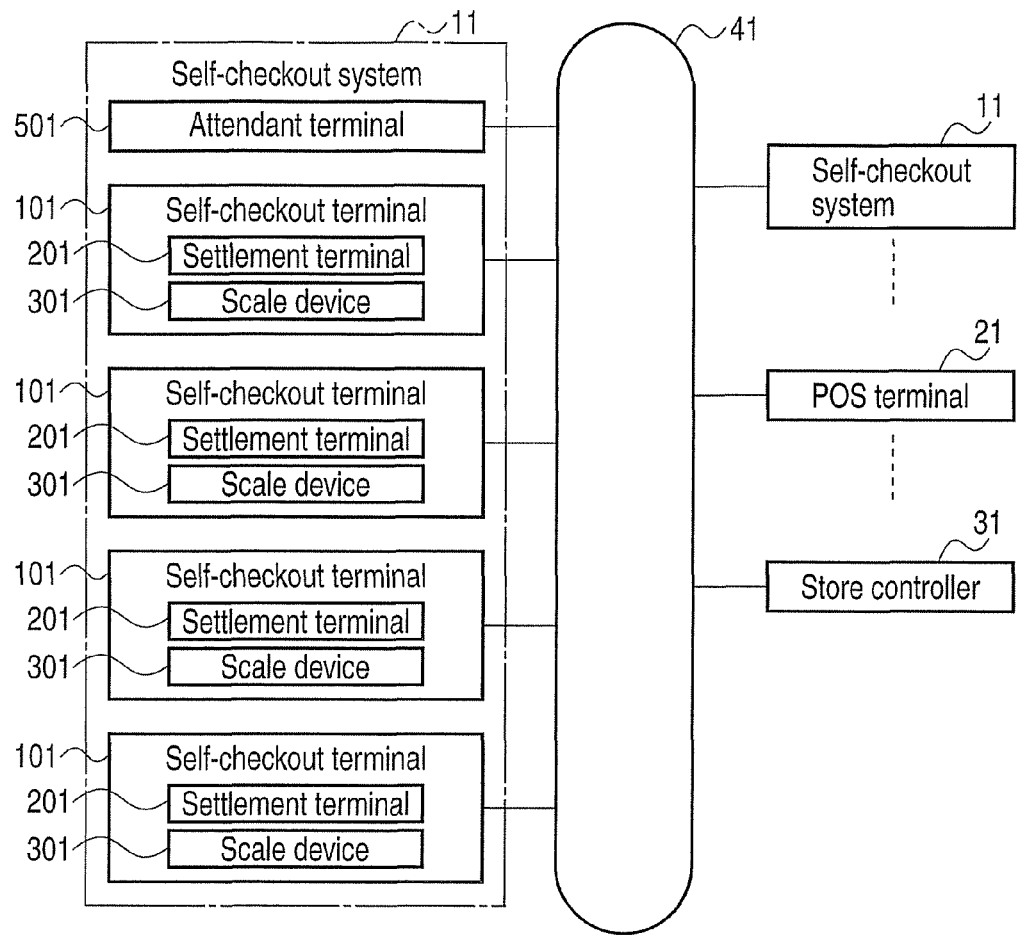
FIG. 1 is a general configuration view of a system according to a first embodiment.

FIG. 1 is a schematic view showing the general configuration of a system according to this embodiment. As shown in FIG. 1, plural self-checkout systems 11, plural POS terminals 21, and a store controller 31 are connected via a communication network 41.

The POS terminals 21 are to be operated by clerks in order carry out payment and are arranged at checkout sites. The store controller 31 is for managing the systems generally and is installed in the backyard of the store or the like.

The self-checkout systems 11 are arranged at checkout sites. In the self-checkout system 11, one attendant terminal 501 is allocated per plural self-checkout terminal 101. Each self-checkout terminal 101 includes a settlement terminal 201 and a scale device 301 (weighing unit).

Figure 2:
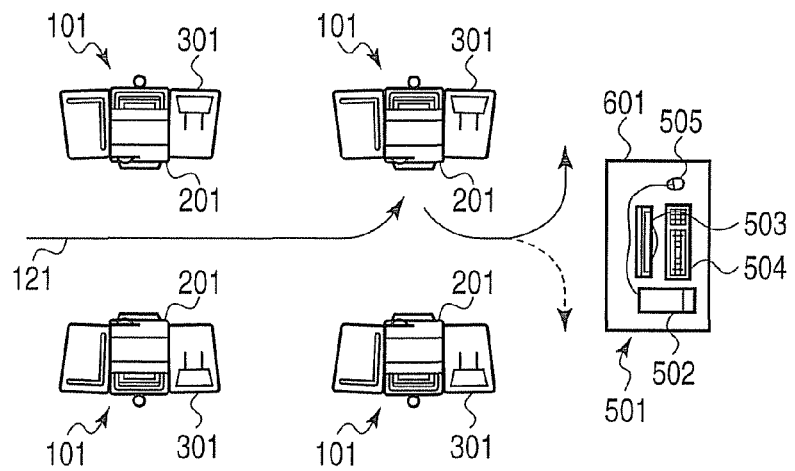
FIG. 2 is a plan view showing the arrangement of each unit constituting a self-checkout system according to the embodiment.

FIG. 2 is a plan view showing the arrangement of each unit constituting the self-checkout system 11. In the self-checkout system 11 of this embodiment, one attendant terminal 501 is allocated to four self-checkout terminals 101. Of the self-checkout terminals 101, each pair of self-checkout terminals 101 is arrayed in parallel along a customer passage 121. Each pair of self-checkout terminals 101 is arranged so that the front sides of the self-checkout terminals 101 face each other across the customer passage 121.

The attendant terminal 501 is arranged at the end of the customer passage 121. The attendant terminal 501 is a personal computer including a body unit 502, a display 503 as a display unit, a keyboard 504, and a pointing device 505 as an operation unit, and is placed on an attendant table 601.

On the display 503 of the attendant terminal 501, the processing status of each self-checkout terminal 101 of the self-checkout system 11 to which this attendant terminal 501 belongs is displayed in real time.

Self-Checkout Terminal

Figure 3:
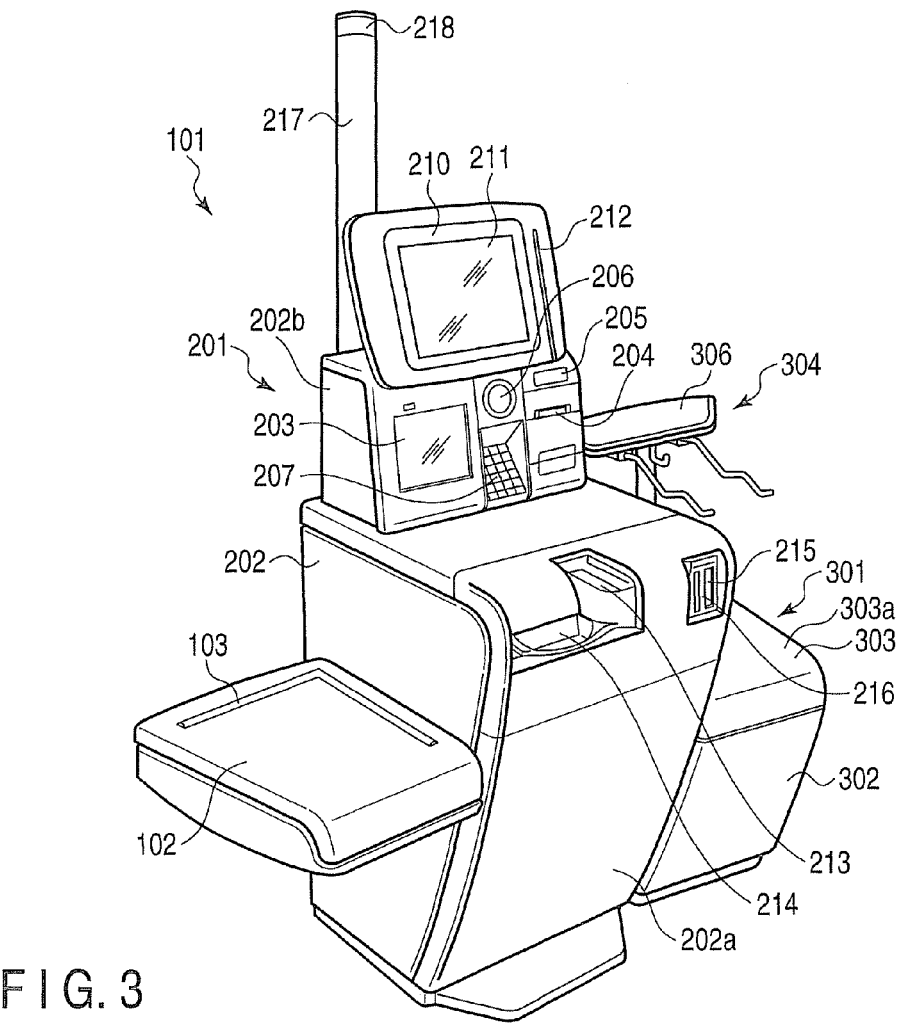
FIG. 3 is a schematic perspective view of a self-checkout terminal according to the embodiment.

FIG. 3 is a schematic perspective view of the self-checkout terminal 101. The settlement terminal 201 has a housing 202 with a placing table 102 protruding from the left side on which to place a basket (not shown) containing articles to be purchased by a customer. On the top side of the placing table 102, an L-shaped protrusion 103 for positioning the basket is formed in a protruding manner.

The housing 202 of the settlement terminal 201 includes a base housing 202a installed on the floor surface and a smaller upper housing 202b placed on the top side of the base housing 202a. The front side of the base housing 202a is sloped so that the projection area of the base housing 202a is narrowed toward the bottom. Thus, the base housing 202a has a shape that is increasingly offset to the rear side toward the bottom.

The upper housing 202b is provided with various user interfaces. That is, on the upper housing 202b, a barcode scanner 203 is arranged to the left as viewed from the front and a receipt issue port 204 and a surveillance camera 205 are arranged to the right. A card presenting face 206 and ten keys 207 are arranged between the barcode scanner 203 and the receipt issue port 204.

The barcode scanner 203 is a fixed scanner which reads a barcode attached to an article and thus inputs an article code. From the receipt issue port 204, a receipt printed by a receipt printer 260 (see FIG. 5) installed within the upper housing 202b is issued. The surveillance camera 205 shoots the area in front of the settlement terminal 201. The result of shooting by the surveillance camera 205 is used to specify payment start timing.

An IC card reader-writer 261 (see FIG. 5) is installed inside the card presenting face 206. The IC card reader-writer 261 performs wireless communication with a non-contact IC card which stores, for example, electronic money and is presented over the card presenting face 206, and reads and writes information from and to the non-contact IC card. The ten keys 207 are used to input a personal identification number at the time of settlement using the non-contact IC card.

An LCD (liquid crystal display) 210 having a liquid crystal display panel is attached to the upper housing 202b. A touch panel 211 is provided on the display surface of the LCD 210. A card reading groove 212 is provided to the right of the LCD 210 as viewed from the front. A magnetic head of a magnetic card reader 262 (see FIG. 5) is provided within the card reading groove 212. The magnetic card reader 262 reads card information such as card number, personal identification number and the like recorded on magnetic stripes of a credit card or the like that is slid in the card reading groove 212.

A deposit and withdrawal device 263 (see FIG. 5) which processes money deposit and withdrawal is installed within the base housing 202a. A coin insertion port 213 through which to deposit coins in the deposit and withdrawal device 263, and a banknote insertion port 215 through which to deposit banknotes, and a coin withdrawal port 214 through which to discharge coins from the deposit and withdrawal device 263 and a banknote withdrawal port 216 through which to discharge banknotes are provided in an upper section of the front side of the base housing 202a.

Moreover, a display pole 217 which displays the current status of the self-checkout terminal 101 is provided upright on the backside of the base housing 202a. This display pole 217 has, at its distal end, a light emitting unit 218 which selectively emits blue light and red light.

Figure 4:
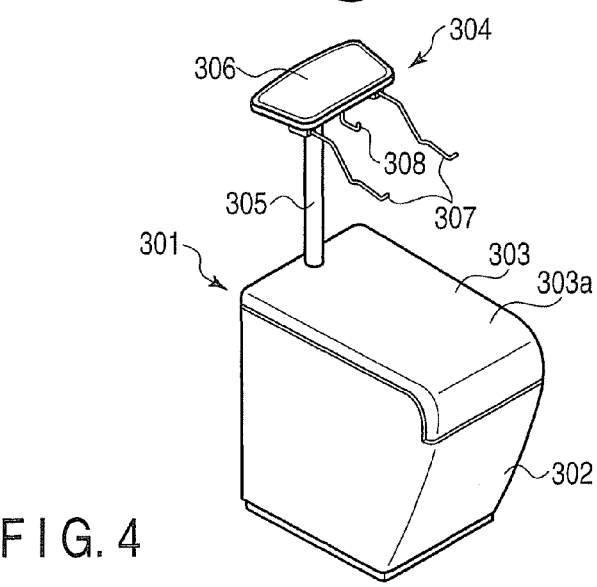
FIG. 4 is a schematic perspective view of a scale device of the self-checkout terminal.

FIG. 4 is a schematic perspective view of the scale device 301. The scale device 301 has a scale housing 302, a scale pan 303 provided on top of the housing 302, and a bag holder 304 provided on top of the scale pan 303. The top side of the scale pan 303 is a placing table 303a. The bag holder 304 is attached to the placing table 303a. Therefore, as viewed from the bag holder 304, the scale pan 303 forms a pedestal. The bag holder 304 includes a temporary placing table 306 at a top end of a pole-like supporting member 305, and a pair of holding arms 307 and a hook 308 provided on the temporary placing table 306. The temporary placing table 306 is used to place temporarily an article after having its barcode read by the barcode scanner 203. The holding parts of a customer's own bag or checkout bag are engaged with the pair of holding arms 307 and the hook 308.

In the scale device 301, a known weighing mechanism using, for example, a load cell, is installed. The scale device 301, using the weighing mechanism, measures the weight of articles placed on the placing table 303a and the temporary placing table 306 and articles put in the checkout bag or the like engaged with the holding arms 307 and the hook 308, and outputs the result of the measurement to the settlement terminal 201.

Figures 5, 6:
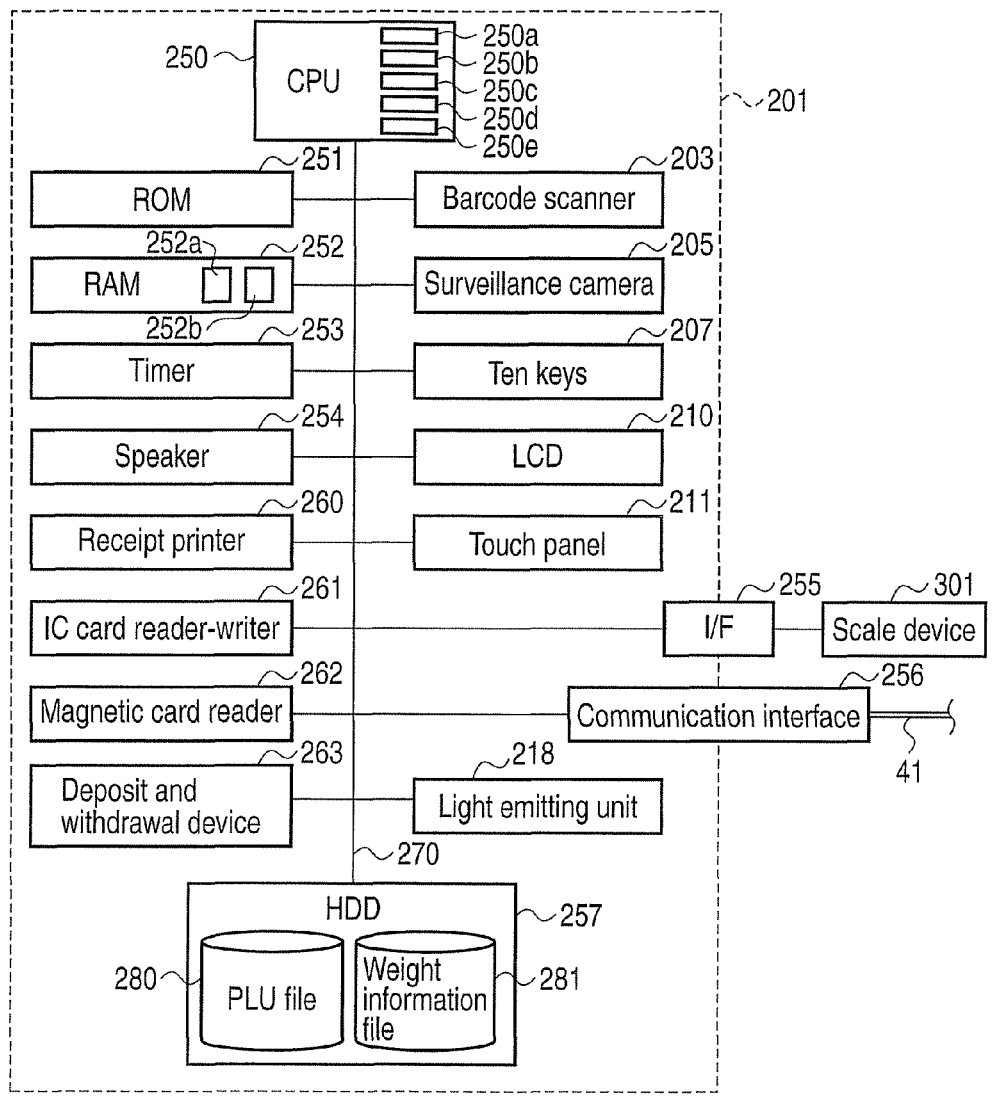
FIG. 5 is a block diagram showing the hardware configuration of the self-checkout terminal.
FIG. 6 is a schematic view showing an example of the data structure of weight information file stored in the self-checkout terminal.

FIG. 5 is a block diagram showing the electrical hardware configuration of the self-checkout terminal 101. The settlement terminal 201 has, in its inside, a CPU (central processing unit) 250 functioning as the center of control. The CPU 250 is provided with the barcode scanner 203, the surveillance camera 205, the ten keys 207, the LCD 210, the touch panel 211, the light emitting unit 218, the receipt printer 260, the IC card reader-writer 261, the magnetic card reader 262, the deposit and withdrawal device 263, a ROM (read only memory) 251, a RAM (random access memory) 252, a timer 253, a speaker 254, an interface 255, a communication interface 256, and an HDD (hard disk drive) 257 (first storage unit). These units are connected via a bus line 270 such as address bus or data bus.

The ROM 251 stores various data therein in a fixed manner. The RAM 252 stores variable data therein in a rewritable manner. The speaker 254 outputs sounds. The interface 255 connects with the scale device 301. The communication interface 256 connects with the communication network 41.

While payment which will be described later is executed, various work storage areas including a storage area 252a and a storage area 252b (second storage unit) are formed in the RAM 252. Weighing values from the scale device 301 are accumulated and stored in the storage area 252a. Article information of articles as payment targets is stored in the storage area 252b.

The operating program of the settlement terminal 201 and various databases are stored in the HDD 257. The databases include at least a PLU file 280 and a weight information file 281.

The PLU file 280 is constituted by a record which describes article information including unit price, article name, article image, discount information and the like in association with an article code allocated to each article.

FIG. 6 is a schematic view showing an example of the data structure of the weight information file 281. The weight information file 281 is constituted by a record which describes weight information including check flag F, preset weight (g) and margin of error (g) in association with each article code described in the PLU file 280. The check flag F shows whether weight check is necessary or not, and has a value "1" when weight check is necessary and "0" when weight check is not necessary. That is, the check flag F is identification information for identifying an article which is not a target of weight check. The article which does not require weight check is, for example, an article that is too heavy-weight or too large-size to be placed on the scale device 301, or an article having significant difference in weight among individual articles, or the like. The preset weight is an average weight of the article. The margin of error defines a range within which identicalness with the preset weight can be found, in consideration of the difference in weight among the articles.

Barcode Scanner

The barcode scanner 203 provided in the settlement terminal 201 will be described.

Figure 7:
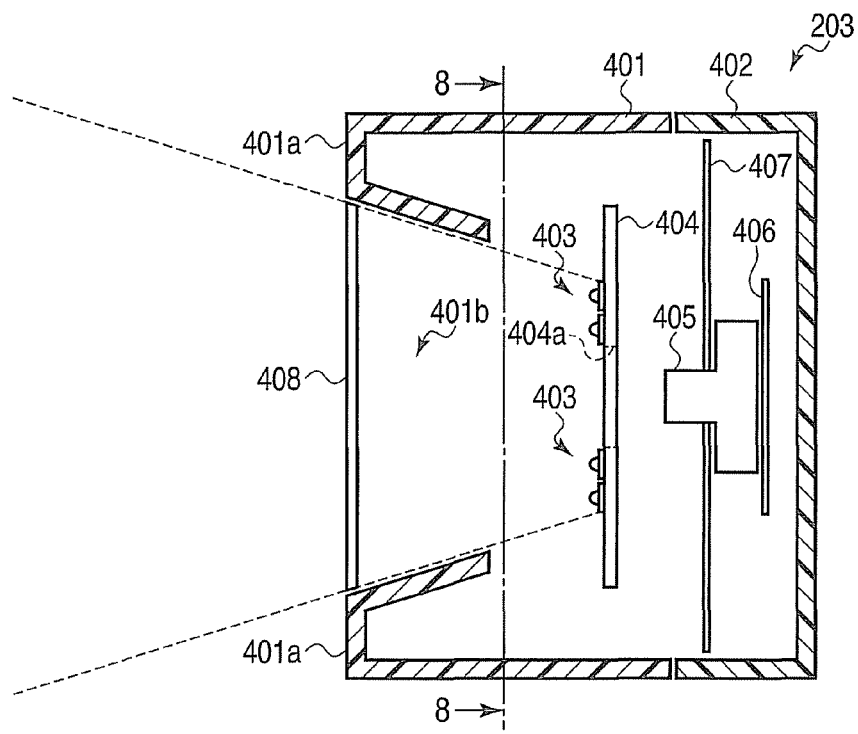
FIG. 7 is a schematic view showing the structure of a barcode scanner provided on the self-checkout terminal.
Figure 8:
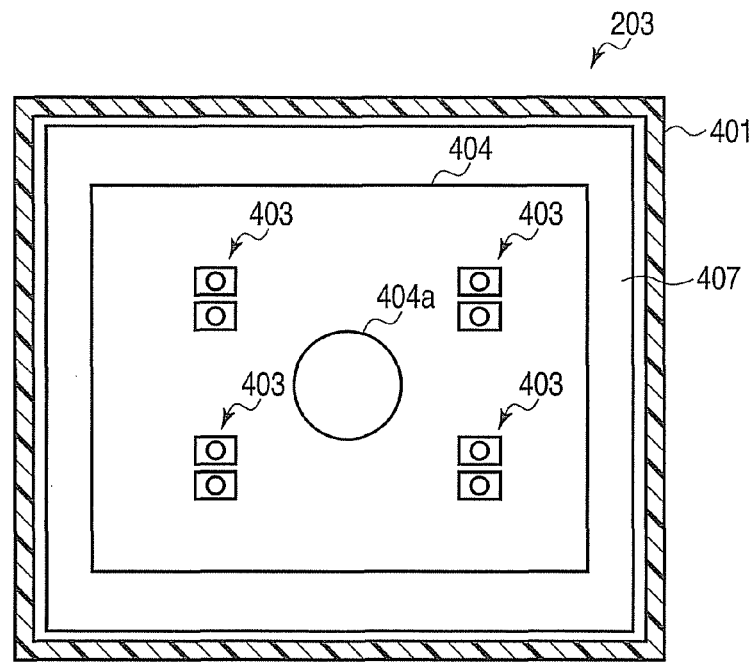
FIG. 8 is a schematic view showing a cross-section 8-8 shown in FIG. 7.

FIG. 7 and FIG. 8 are schematic views showing the structure of the barcode scanner 203. FIG. 8 shows a cross-section 8-8 across the barcode scanner 203 shown in FIG. 7.

As shown in FIG. 7, a casing of the barcode scanner 203 is formed by a top cover 401 and a bottom cover 402. In this casing, a light source 403, a lighting board 404 to which the light source 403 is attached, a lens 405, a camera board 406, and an image processing board 407 are housed.

The light source 403 illuminates an article. The lens 405 receives reflected light from the article illuminated by the light source 403. The camera board 406 converts the reflected light received by the lens 405 to an electrical signal and thus generates image data. The image processing board 407 decodes a barcode included in the image data generated by the camera board 406 and generates an article code. The image processing board 407 outputs the generated article code to the CPU 250.

A sloped opening 401b having a rectangular edge is formed in a top plate 401a of the top cover 401, and a glass member 408 is fitted to close this opening 401b. The lens 405 is fixed to the camera board 406 so that the center axis of the lens 405 passes the center of the opening 401b of the top cover 401.

The lighting board 404 is provided between the glass member 408 and the lens 405. A circular opening 404a centering around an extension line of the center axis of the lens 405 is formed in the lighting board 404 so that a subject image can reach the lens 405 (see FIG. 8).

The light source 403 includes LEDs arranged at four positions on the lighting board 404 with two LEDs each at each position so as to surround the opening 404a, as shown in FIG. 8.

In the barcode scanner 203 having such configuration, when the light source 403 is turned on, a predetermined area outside of the glass member 408 is illuminated, as indicated by broken lines in FIG. 7. When a barcode of an article is presented at an appropriate angle in this area, the barcode is decoded and an article code is detected. That is, the light source 403 functions as a lighting unit in this embodiment. The other parts except the light source 403, that is, the lens 405, the camera board 406 and the image processing board 407 or the like, function as a detection unit in this embodiment.

Operation

Next, the operation of the self-checkout terminal 101 in payment will be described.

The CPU 250 of the settlement terminal 201 executes the operating program stored in the HDD 257, thereby functioning as a reading unit 250a, a determination unit 250b, a storage control unit 250c, a light control unit 250d and a notification unit 250e.

The reading unit 250a reads out article information and weight information corresponding to the article code inputted by the barcode scanner 203 or the like, from the PLU file 280 and the weight information file 281. Specifically, the reading unit 250a executes processing of ACTs 110 and 302, which will be described later.

The determination unit 250b determines whether or not the weight measured by the scale device 301 after the article code is inputted by the barcode scanner 203 or the like is identical with the weight indicated by the weight information read out by the reading unit 250a. Specifically, the determination unit 250b executes processing of ACTs 303 to 310, which will be described later.

The storage control unit 250c stores the article information read out by the reading unit 250a into the storage area 252b when it is determined by the determination unit 250b that the weights are identical. Specifically, the storage control unit 250c executes processing of ACT 111, which will be described later.

The lighting control unit 250d controls each light source 403 of the barcode scanner 203 to be turned off at least after it is determined by the determination function that the weights are not identical. Specifically, the lighting control unit 250d executes processing of ACTs 103, 107, 401 and 404, which will be described later.

The notification unit 250e notifies of an error when the weight of the article is not measured by the scale device 301 even after a lapse of a predetermined time after the article code is inputted by the barcode scanner 203 or the like. Specifically, the notification unit 250e executes processing of ACT 306, which will be described later.

Hereinafter, the processing realized by at least partly using the units 250a to 250e will be described specifically.

While waiting for payment, the CPU 250 of the self-checkout terminal 101 monitors a video shot by the surveillance camera. When the distance between the customer appearing in the video shot by the surveillance camera 205 and the self-checkout terminal 101 is short, the CPU 250 starts payment according to the operating program stored in the HDD 257.

Figure 9:
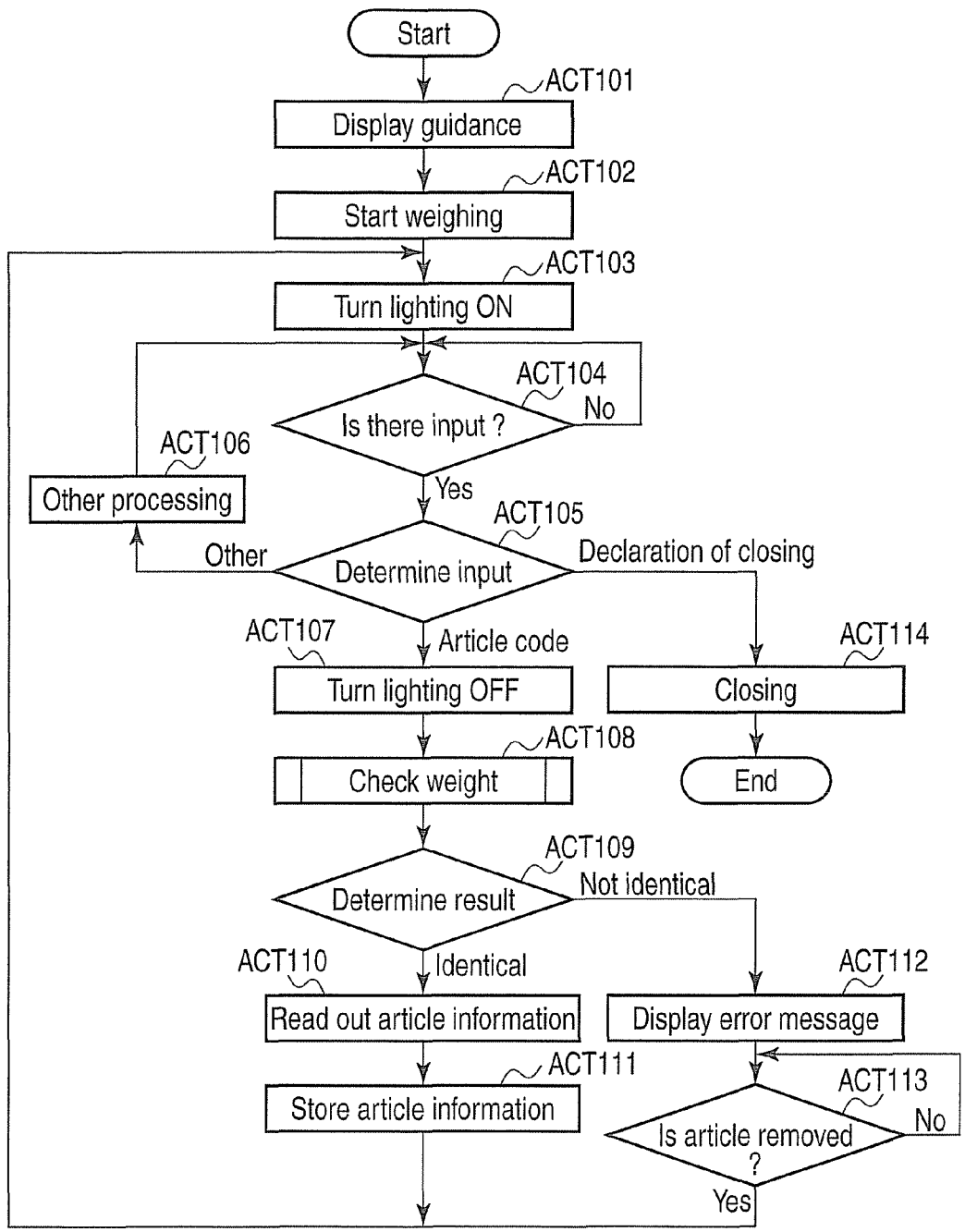
FIG. 9 is a flowchart of payment executed by a CPU of the self-checkout terminal.

FIG. 9 is a flowchart of processing executed by the CPU 250 of the self-checkout terminal 101 in payment. In this processing, first, the CPU 250 displays, on the LCD 210, guidance showing procedures for payment using the self-checkout terminal 101 (ACT 101). For example, this guidance includes a message that a shopping basket should be placed on the placing table 102, a message that an article should be taken out of the shopping basket and its barcode should be scanned, a message that the article code can be inputted by operation on the touch panel 211 for an article with no barcode attached thereto, and so on.

Figure 10:
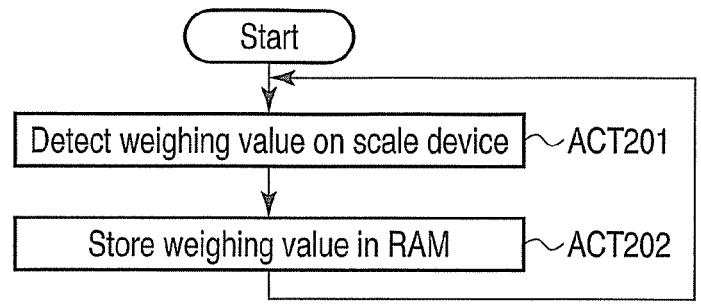
FIG. 10 is a flowchart of weighing executed by the CPU of the self-checkout terminal.

After displaying such guidance on the LCD 210, the CPU 250 instructs the scale device 301 to start weighing (ACT 102). After that, the CPU 250 executes processing shown in FIG. 10, parallel to the payment. That is, the CPU 250 detects weighing values from the scale device 301 via the interface 255 (ACT 201) and accumulates and stores the detected weighing values in the storage area 252a formed in the RAM 252 (ACT 202).

Back to the explanation of the flowchart of FIG. 9, after the processing of ACT 102, the CPU 250 instructs the barcode scanner 203 to turn on each light source 403 (ACT 103). When this instruction is received, the lighting board 404 of the barcode scanner 203 turns on each light source 403. Moreover, the CPU 250 waits for an input from the barcode scanner 203, the ten keys 207, the touch panel 211 and the magnetic card reader 262 or the like in the state where each light source 403 is on (ACT 104). When there is a certain input from the barcode scanner 203, the ten keys 207, the touch panel 211 and the magnetic card reader 262 or the like, the CPU 250 determines the type of the input (ACT 105). The type of the input determined here is roughly categorized into input of article code, declaration of closing, and other inputs. An article code is inputted by the operator causing the barcode scanner 203 to read a barcode attached to an article or by the operator touching and operating a GUI component for article designation displayed on the LCD 210 and thus designating an article to be purchased. A declaration of closing is made by the operator touching and operating a GUI component for declaration of closing displayed on the LCD 210. The other inputs include reading of a point card by the magnetic card reader 262 or the like and are carried out by operation of the interface for each input.

When the input detected in the processing of ACT 104 is other inputs ("Other" in ACT 105), the CPU 250 executes processing corresponding to this input (ACT 106). After that, the CPU 250 returns to the processing of ACT 104 and waits for the next input.

Meanwhile, when the input detected in the processing of ACT 104 is the input of an article code ("Article code" in ACT 105), the CPU 250 instructs the barcode scanner 203 to turn off each light source 403 (ACT 107). When this instruction is received, the lighting board 404 of the barcode scanner 203 turns off each light source 403. After each light source 403 is thus turned off, the barcode scanner 203 no longer can read any barcode.

Figure 11:
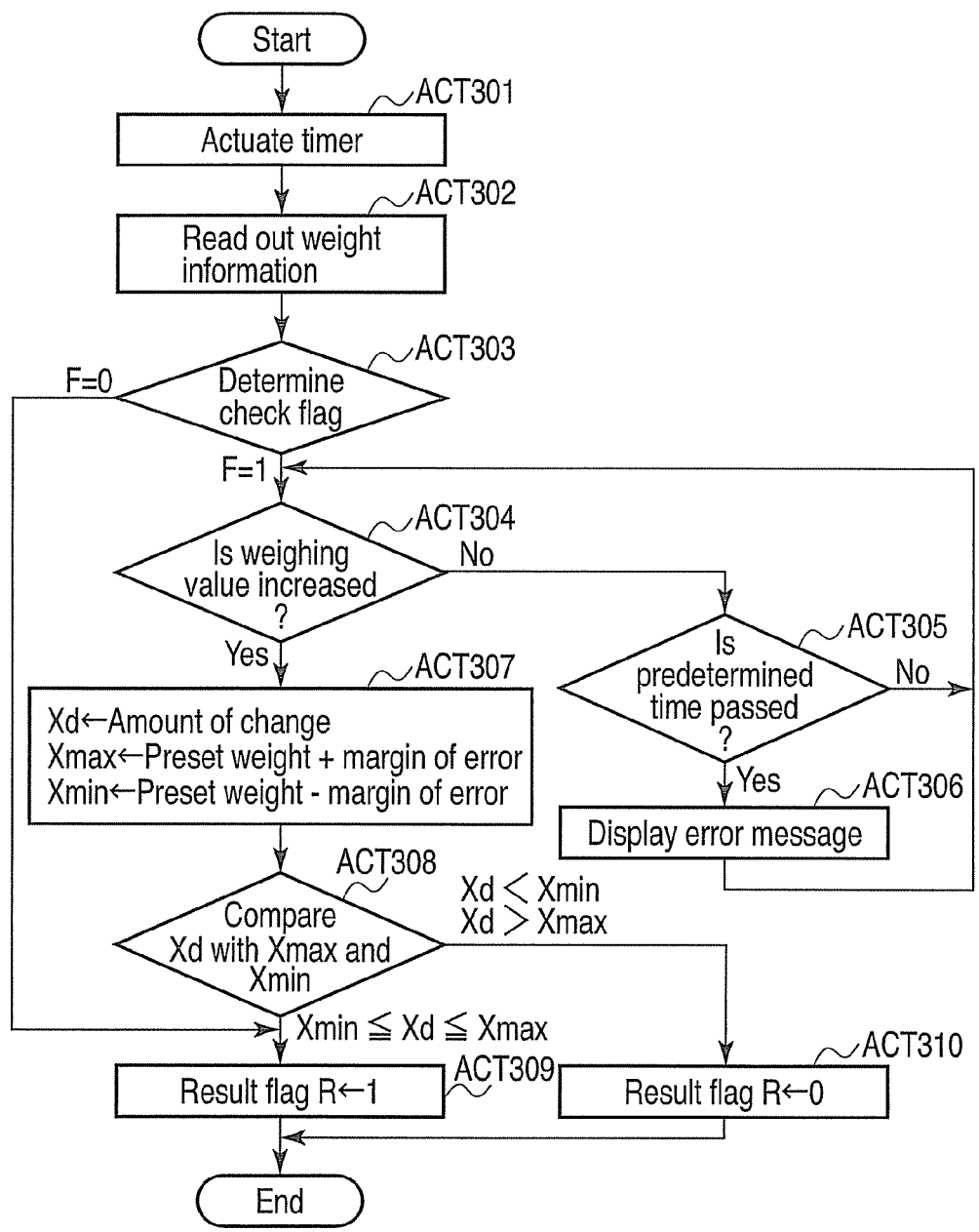
FIG. 11 is a flowchart of weight check executed by the CPU Of the self-checkout terminal.

After each light source 403 is turned off, the CPU 250 executes weight check (ACT 108). That is, the CPU 250 executes a weight check subroutine according to the flowchart shown in FIG. 11.

In this processing, first, the CPU 250 causes the timer 253 to start measuring a predetermined waiting time (ACT 301). Next, the CPU 250 reads out weight information corresponding to an article code whose input is accepted in the processing of ACT 104 that is immediately before, from the weight information file 281 to the RAM 252 (ACT 302), and determines whether the check flag F included in the read-out weight information has a value "0" or "1" (ACT 303). When the value of the check flag F is "1" as a result ("F=1" in ACT 303), the CPU 250 determines whether or not the weighing value by the scale device 301 is increased after the article code is inputted in the processing of ACT 104 that is immediately before, with reference to the storage area 252a formed in the RAM 252 (ACT 304). When the weighing value is not increased (No in ACT 304), the CPU 250 determines whether the measuring of the waiting time by the timer 253 is finished or not (ACT 305). When the measuring of the waiting time by the timer 253 is not finished (No in ACT 305), the CPU 250 determines again whether the weighing value by the scale device 301 is increased or not (ACT 304).

When the measuring of the waiting time by the timer 253 is finished (Yes in ACT 305) while the processing of ACTs 304 and 305 is repeated, the CPU 250 displays a predetermined error message on the LCD 210 and returns to the processing of ACT 304. The error message displayed on the LCD 210 here is a message prompting the customer to place the article indicated by the article code inputted in the processing of ACT 104 that is immediately before, on the placing table 303a of the scale device 301 or the like, or a message prompting the customer to put the article in a checkout bag or the like held on the bag holder 304, for example, "Put the article whose barcode is read into a bag" or the like. After this message is displayed once, the display may be continued until the error is canceled, and the processing of ACT 305 may be avoided.

Meanwhile, when the weighing value by the scale device 301 is increased (Yes in ACT 304) while the processing of ACTs 304 and 305 is repeated, the CPU 250 generates variables Xd, Xmax and Xmin in the RAM 252 and describes a predetermined numeric value for each of these variables (ACT 307). That is, the difference between weighing values before and after change detected in the processing of ACT 304 (the amount of increase) is described as the variable Xd. A value acquired by adding the preset weight of the weight information read out in the processing of ACT 301 and a margin of error for this weight information is described as the variable Xmax. A value acquired by subtracting the margin of error for the weight information from the preset weight of the weight information is described as the variable Xmin.

The CPU 250 then compares the values of the variables Xd, Xmax and Xmin (ACT 308). Here, when the variable Xd is equal to or greater than the variable Xmin (Xd=Xmin included) and is equal to or smaller than Xmax (Xd=Xmax included) ("Xmin≦Xd≦Xmax" in ACT 308), the CPU 250 generates a result flag R in RAM 252 and sets its value to "1" (ACT 309). Meanwhile, when Xd is smaller than Xmin (Xd=Xmin not included) or greater than Xmax (Xd=Xmax not included) ("Xd<Xmin, Xd>Xmax" in ACT 308), the CPU 250 generates a result flag R in the RAM 252 and sets its value to "0" (ACT 310). After thus generating the result flag R set to "0" or "1", the CPU 250 completes the series of weight check procedures.

Back to the explanation of the flowchart of FIG. 9, after carrying out the weight check as described above, the CPU 250 determines the result of the weight check with reference to the result flag R formed in the RAM 252 (ACT 109). Here, when the result flag R has the value "1", the CPU 250 determines that the article whose article code is inputted in the processing of ACT 104 that is immediately before is identical with the article placed on the placing table 303a of the scale device 301 or the article put in the checkout bag or the like held on the bag holder 304 ("Identical" in ACT 109). Here, the CPU 250 reads out the article information corresponding to the article code inputted in the processing of ACT 104 that is immediately before, from the PLU file 280 (ACT 110). The CPU 250 then stores the read-out article information in the storage area 252b formed in the RAM 252 (ACT 111). After thus storing the article information in the storage area 252b, the CPU 250 instructs the barcode scanner 203 to turn on each light source 403 and thus causes each light source 403 to be turned on (ACT 103) and waits for the next input (ACT 104).

Meanwhile, when the value of the result flag R is "0" in the processing of ACT 109, the CPU 250 determines that the article whose article code is inputted in the processing of ACT 104 that is immediately before is not identical with the article placed on the placing table 303a of the scale device 301 or the article put in the checkout bag or the like held on the bag holder 304 ("No identical" in ACT 109). Here, the CPU 250 discards the article code inputted in the processing of ACT 104 that is immediately before and displays a predetermined error message on the LCD 210 (ACT 112). The error message here includes a message showing the cause of the error, for example, "There is an article whose barcode is not read in the bag", and a message prompting the customer to remove the article whose article code is inputted in the processing of ACT 104 that is immediately before, from the placing table 303a or the checkout bag or the like held on the bag holder 304, for example, "Remove the article".

In the state where such error message is displayed, the CPU 250 waits until the article whose article code is inputted in the processing of ACT 104 that is immediately before is removed from the placing table 303a or the checkout bag or the like held on the bag holder 304 (ACT 113). Specifically, after the error message is displayed in the processing of ACT 112, it is repeatedly determined whether the weighing value by the scale device 301 is decreased by substantially the same amount as the variable Xd or not. When the article whose article code is inputted immediately before is eventually removed by the customer from the placing table 303a or the checkout bag or the like held on the bag holder 304, the weighing value by the scale device 301 decreases by substantially the same amount as the variable Xd. Here, the CPU 250 determines that the article whose article code is inputted in the processing of ACT 104 that is immediately before is removed from the placing table 303a or the checkout bag or the like held on the bag holder 304 (Yes in ACT 113). The CPU 250 instructs the barcode scanner 203 to turn on each light source 403 and thus causes each light source 403 to be turned on (ACT 103) and waits for the next input (ACT 104). In this case, the customer must input the article code of the removed article again and then place the article on the placing table 303a or the like or put the article in the checkout bag or the like held on the bag holder 304.

As the customer eventually finishes inputting the article codes of all the articles in the shopping basket placed on the placing table 102 and then placing the articles on the placing table 303a or the like or putting the articles in the checkout bag or the like held on the bag holder 304, the customer touches and operates the GUI component for declaration of closing displayed on the LCD 210. Here, the CPU 250 determines that the closing of article code input is declared ("Declaration of closing" in ACT 105). The CPU 250 executes closing (ACT 114) and ends the payment. In the closing, the CPU 250 first calculates the total amount of money of the purchased articles based on the unit price included in each piece of article information stored in the storage area 252b. The CPU 250 then displays the calculated total amount of money on the LCD 210 and accepts payment of the price. The price can be paid, for example, by cash or electronic money. When paying the price by cash, the customer inserts cash into the coin insertion port 213 and the banknote insertion port 215. Meanwhile, when paying the price by electronic money, the customer presents an IC card with electronic money stored therein over the card presenting face 206. When cash is inserted, the deposit and withdrawal device 263 counts the amount of money inserted, and dispenses the difference from the price through the coin withdrawal port 214 and the banknote withdrawal port 216. Meanwhile, when an IC card with electronic money stored therein is presented over the card presenting face 206, the IC card reader 261 performs wireless communication with the IC card and debits the price. After the price is paid, the receipt printer 260 issues a receipt on which detailed information or the like of the articles sold is printed, from the receipt issue port 204.

Figure 12:
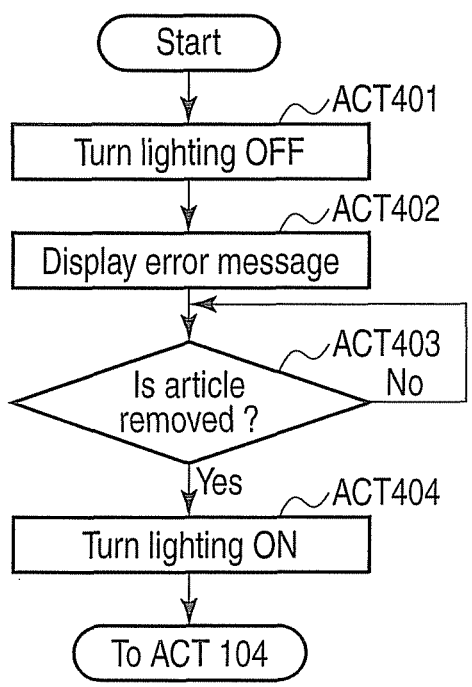
FIG. 12 is a flowchart of error processing executed by the CPU of the self-checkout terminal.

When an article is placed on the placing table 303a or the like or an article is put in the checkout bag or the like held on the bag holder 304 and the weight of the article is measured by the scale device 301 in the state where an input is waited for in the processing of ACT 104, the CPU 250 operates according to the flowchart shown in FIG. 12. In this processing, first, the CPU 250 instructs the barcode scanner 203 to turn off each light source 403 (ACT 401). When this instruction is received, the lighting board 404 of the barcode scanner 203 turns off each light source 403. Next, the CPU 250 displays a predetermined error message on the LCD 210 (ACT 402). The error message here includes a message showing the cause of the error, for example, "There is an article whose barcode is not read in the bag", and a message prompting the customer to remove the article from the placing table 303a or the checkout bag or the like held on the bag holder 304 without inputting the article code, for example, "Remove the article".

In the state where such error message is displayed, the CPU 250 waits until the article whose article code is not inputted is removed from the placing table 303a or the checkout bag or the like held on the bag holder 304, as in the processing of ACT 113 (ACT 403). When the weight measured by the scale device 301 is decreased by substantially the same amount as the weight measured at the start of the processing according to the flowchart of FIG. 12, the CPU 250 determines that the article whose article code is not inputted is removed from the placing table 303a or the checkout bag or the like held on the bag holder 304 (Yes in ACT 403). The CPU 250 then instructs the barcode scanner 203 to turn on each light source 403 and thus causes each light source 403 to turn on (ACT 404) and returns to the processing of ACT 104.

As described above, in the self-checkout terminal 101 according to this embodiment, each light source 403 of the barcode scanner 203 is turned off when an article code is detected, and each light source 403 is turned on when it is determined that the weights are identical in weight check. As each light source 403 is controlled in this way, each light source 403 turns off at least when it is determined that the weights are not identical in weight check. That is, an article code cannot be inputted using the barcode scanner 203 immediately after it is determined that the weights are not identical in weight check. Therefore, the customer can be securely made aware of the weighing error. Moreover, in the state where a weighing error is generated, the next article code is not read using the barcode scanner 203 and therefore the customer does not become confused about which article the weighing error is generated with.

When a weighing error is generated, an error message is displayed on the LCD 210. Therefore, the customer notices the abnormality based on the error message even if the customer tries to input the article code using the GUI component for article designation displayed on the LCD 210 in the state where the weighing error is generated.

Moreover, in the self-checkout terminal 101 according to this embodiment, when it is determined that the weights are not identical in weight check, each light source 403 is turned on in response to that the article related to the determination is removed from the placing table 303a or the checkout bag or the like held on the bag holder 304. Thus, the customer can be notified of the cancellation of the weighing error by the turning on of each light source 403. The customer can also resume the input of the article code immediately after the weighing error is canceled.

Second Embodiment

Next, a second embodiment will be described. In this embodiment, an article code input device used in a checkout system where a clerk operates the device to complete a series of payment processes will be described an example. The barcode scanner provided in the article code input device described here has a similar configuration to the barcode scanner 203 described in the first embodiment and therefore its components are denoted by the same reference numerals and will not be described further in detail.

System Configuration

FIG. 13 is a block diagram showing the electrical hardware configuration of the checkout system according to this embodiment. This system includes an article code input device 701 and a POS terminal 801. The article code input device 701 and the POS terminal 801 are connected with each other via a communication cable 901.

The article code input device 701 and the POS terminal 801 are arranged on a checkout counter which forms a checkout lane at a checkout site and are operated by a clerk in charge of checkout services. The article code input device 701 plays the role of inputting the article code of an article put in the shopping basket carried by the customer. The POS terminal 801 plays the role of completing payment based on the article codes inputted by the article code input device 701.

The article code input device 701 has, in its inside, a CPU 702 functioning as the center of control. A ROM 703, a RAM 704, a speaker 705, a keyboard 706, a clerk-side LCD 707, a customer-side LCD 708, a touch panel 709, a communication interface 710, and the barcode scanner 203 are connected to the CPU 702 via a bus line 711 such as address bus or data bus.

The ROM 703 stores various data therein in a fixed manner. The RAM 704 stores variable data therein in a rewritable manner. The speaker 705 outputs sounds. The touch panel 709 is provided on the clerk-side LCD 707. The communication interface 710 connects the communication cable 901. The keyboard 706 includes operation keys, ten keys and the like for giving an instruction to start and close the input of an article code.

The clerk-side LCD 707 has its display side facing the side where the clerk stands, and displays a GUI component or the like for inputting the article code of an article with no barcode attached thereto. This GUI component can be operated by touch via the touch panel 709.

The customer-side LCD 708 has its display side facing the side where the customer stands, and displays the article name, unit price and the like that are specified based on the inputted article code.

The PLU file 802 is stored in a storage unit such as HDD provided in the POS terminal 801. The PLU file 802 includes the description of article information including unit price, article name, article image, discount information and the like in association with an article code allocated to each article.

Operation

Next, the operation of the article code input device 701 in payment will be described.

Figure 14:
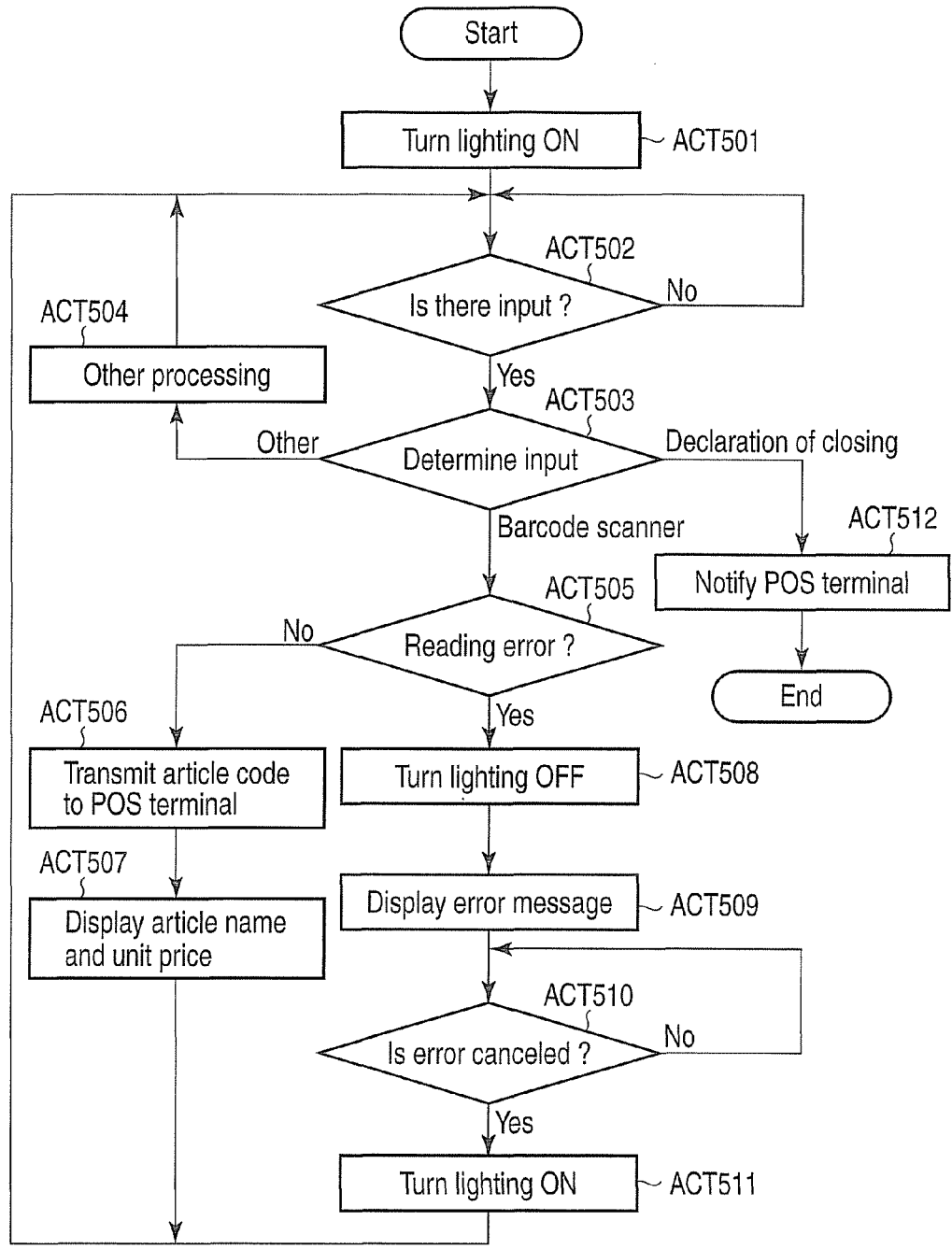
FIG. 14 is a flowchart of payment executed by a CPU of an article code input device according to the second embodiment.

As the customer moves to the checkout lane, the clerk in charge of operating the article code input device 701 presses a predetermined operation key provided on the keyboard 706 and thus declares the start of payment. Here, the CPU 702 of the article code input device 701 operates according to the flowchart shown in FIG. 14.

In this processing, first, the CPU 702 instructs the barcode scanner 203 to turn on each light source 403 (ACT 501). When this instruction is received, the lighting board 404 of the barcode scanner 203 turns on each light source 403. Moreover, the CPU 702 waits for an input from the barcode scanner 203, the keyboard 706 and the touch panel 709 or the like in the state where each light source 403 is turned on (ACT 502). When there is a certain input from the barcode scanner 203, the keyboard 706 and the touch panel 709 or the like, the CPU 702 determines the type of the input (ACT 503). The type of the input determined here is roughly categorized into input from the barcode scanner 203, declaration of closing, and other inputs. A declaration of closing is made by a touch-operation on a GUI component for declaration of closing displayed on the clerk-side LCD 707. The other inputs include, for example, input of an article code by a touch-operation of a GUI component for article designation displayed on the clerk-side LCD 707, or the like.

When the input detected in the processing of ACT 502 is the other inputs ("Other" in ACT 503), the CPU 702 executes processing corresponding to the input (ACT 504). For example, when an article code is inputted by a touch-operation on the GUI component for article designation displayed on the clerk-side LCD 707, the inputted article code is transmitted to the POS terminal 801 via the communication interface 710. After the processing of ACT 504, the CPU 702 returns to the processing of ACT 502 and waits for the next input.

Meanwhile, when the input detected in the processing of ACT 502 is an input from the barcode scanner 203 ("Barcode scanner" in ACT 503), the CPU 702 determines whether a barcode reading error is generated or not (ACT 505). The reading error here is, for example, a partial lack of the code read by the barcode scanner 203, a mismatch between the code system of the read code and the code system of the article code, duplicate reading of the barcode, or the like. The duplicate reading is an error detected when the barcode attached to the same article is read consecutively.

When it is determined that no reading error is generated (No in ACT 505), the CPU 702 transmits the information inputted from the barcode scanner 203, that is, the article code, to the POS terminal 801 (ACT 506). When this article code is received by the POS terminal 801, the PLU file 802 is searched for article information corresponding to this article code. The article information that is found here is stored in the storage unit such as RAM and also sent back to the article code input device 701. When the article information sent back from the POS terminal 801 is received, the CPU 702 displays the article name and unit price included in the received article information on the clerk-side LCD 707 and the customer-side LCD 708 (ACT 507). After that, the CPU 702 returns to the processing of ACT 502 and waits for the next input.

Meanwhile, when it is determined that a reading error is generated in the processing of ACT 505 (Yes in ACT 505), the CPU 702 instructs the barcode scanner 203 to turn off each light source 403 (ACT 508). When this instruction is received, the lighting board 404 of the barcode scanner 203 turns off each light source 403. After each light source 403 is thus turned off, the barcode scanner 203 cannot read barcodes.

After turning off each light source 403, the CPU 702 displays an error message that a reading error is generated, on the clerk-side LCD 707 (ACT 509), and waits for the error to be canceled (ACT 510). The reading error becomes canceled, for example, by an operation on the keyboard 706 or an operation on a GUI component for error cancellation displayed together with the error message on the clerk-side LCD 707. When the reading error is canceled by such operation (Yes in ACT 510), the CPU 702 instructs the barcode scanner 203 to turn on each light source 403 (ACT 511). When this instruction is received, the lighting board 404 of the barcode scanner 203 turns on each light source 403. After that, the CPU 702 returns to the processing of ACT 502 and waits for the next input.

As the clerk eventually finishes inputting the article codes of all the articles which the customer wants to purchase and for which payment is in progress, the clerk performs a touch-operation on the GUI component for declaration of closing displayed on the clerk-side LCD 707. Here, the CPU 702 determines that the closing of article code input is declared ("Declaration of closing" in ACT 503), then notifies the POS terminal 801 of the declaration of closing (ACT 512), and ends the payment.

When the notification that the closing is declared is received from the article code input device 701, the POS terminal 801 calculates the total amount of money based on the unit price included in the article information stored in the storage unit of the POS terminal 801 in the payment. The calculated total amount of money is displayed on the display unit such as LCD and the payment of the price is accepted. The price is paid by cash, electronic money, credit card or the like.

As described above, in the article code input device 701 according to this embodiment, each light source 403 of the barcode scanner 203 is turned off when a reading error is generated. As each light source 403 is controlled in this way, an article code cannot be inputted using the barcode scanner 203 after the reading error is generated. Therefore, the clerk can be securely made aware of the reading error. Moreover, in the state where a reading error is generated, the next article code is not read using the barcode scanner 203 and therefore the clerk does not become confused about which article the reading error is generated with.

When a reading error is generated, an error message is displayed on the clerk-side LCD 707. Therefore, the clerk notices the abnormality based on the error message even if the clerk tries to input the article code using the GUI component for article designation displayed on the clerk-side LCD 707 in the state where the reading error is generated.

Modifications

For the configurations disclosed in the embodiments, various changes can be made in embodying stages. Examples of modifications include the following.

(1) In the first embodiment, the case where the settlement terminal 201 and the scale device 301 as separate devices form the self-checkout terminal 101 is described as an example. However, the settlement terminal 201 and the scale device 301 as an integrated unit may form the self-checkout terminal 101.

(2) In the first embodiment, each light source 403 is turned off immediately after an article code is inputted. However, the timing of turning off each light source 403 should not be limited to immediately after an article code is inputted. Each light source 403 may be turned off at any time point before the next article code is inputted. For example, it is possible not to turn off each light source 403 immediately after an article code is inputted, and instead to turn off each light source 403 after it is determined that the weights are not identical in weight check.

(3) In the first embodiment, an error message is displayed on the LCD 210 when it is determined that the weights are not identical in weight check or when an article whose article code is not inputted is placed on the placing table 303a or the like, and a recovery from the error is made in response to the removal of the article from the placing table 303a or the checkout bag or the like held on the bag holder 304 (ACTs 113, 403). However, other than removing the article, a technique such as operating a predetermined GUI component displayed on the LCD 210 to recover from the error may also be employed.

(4) In the second embodiment, the article code input device 701 which inputs an article code to the POS terminal 801 is described as an example. However, the configuration to turn off each light source 403 when a reading error is generated may be applied to a device like the self-checkout terminal 101 described in the first embodiment.

(5) In the second embodiment, it is described that each light source 403 is turned off immediately after a reading error is generated. However, the timing of turning off each light source 403 should not be limited to immediately after a reading error is generated. The light source 403 may be turned off at any time point before the next article code is inputted. For example, each light source 403 may be turned off at the time point when there is a certain input from the barcode scanner 203, and each light source 403 may be turned on when that input is not a reading error.

(6) In the second embodiment, the case where the CPU 702 of the article code input device 701 controls the timing of turning on and off each light source 403 is described as an example. However, this control may be executed by a control unit provided in the barcode scanner 203. That is, the control unit of the barcode scanner 203 detects the generation of a reading error and instructs the light board 404 to turn on and off each light source 403. Even in such case, similar advantages to the advantages disclosed in the second embodiment are achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A checkout terminal comprising:
a light source which illuminates an article;
a scanner which detects an article code from the article illuminated by the light source, and picks up an image of the article illuminated by the light source and thus generates image data and decodes a barcode included in the image data and thus detects the article code;
a placing table to place the article on;
a scale device which measures a weight of the article placed on the placing table;
a controller that performs operations, comprising:
reading out, from a first storage unit in which weight information including information indicating a weight of an article and article information are stored for each article, the weight information and the article information of the article indicated by the article code detected by the scanner;
determining whether or not the weight measured by the scale device after the article code is detected by the scanner is identical with the weight indicated by the weight information read out;

a storing the article information read out in a second storage unit for storing article information of an article as a payment target, if it is determined that the weights are identical;

controlling the light source so as to be turned off if it is determined that the weights are not identical, turning off the light source if the article code is detected by the scanner, and turns on the light source if it is determined that the weights are identical, and turns off the light source if it is determined that the weights are not identical, and wherein after it is determined that the weights are not identical, the controller turns on the light source in response to removal of the article related to the determination from the placing table, wherein the weight information includes identification information which identifies an article that is not a target of determination, and if the article is identified by the identification information included in the weight information read out as an article that is not a target of determination, the determination is not carried out using the weight information and the storing of the article information read out, together with the weight information in the second storage unit.

2. The terminal according to claim 1, wherein the weight information includes a numeric value indicating the weight of the article and a numeric value indicating an allowable margin of error, and if the weight acquired as a result of weighing by the scale device of the article whose article code is detected by the scanner falls within a range represented by the numeric value indicating the weight of the article included in the weight information read out and the numeric value indicating the allowable margin of error, it is determined that the two weights are identical.

3. The terminal according to claim 1, wherein the controller turns off the light source if the weight of the article is measured by the scale device before the article code is detected by the scanner.

4. The terminal according to claim 1, further comprising a display unit which displays guidance showing a procedure for payment using the checkout terminal, wherein the scale device starts weighing after the guidance is displayed on the display unit.

5. The terminal according to claim 1, further comprising a notification unit which notifies of an error if the weight of the article is not measured by the scale device even after a lapse of a predetermined time after the article code is detected by the scanner.

6. A control method for a checkout terminal including a lighting unit which illuminates an article, a detection unit which detects an article code from the article illuminated by the lighting unit, a placing table to place the article on, and a weighing unit which measures a weight of the article placed on the placing table, the method comprising:

picking up an image of the article illuminated by the lighting unit and generating image data, and decoding a barcode included in the image data and detecting the article code;

reading out, from a first storage unit in which weight information including information indicating a weight of an article and article information are stored for each article, the weight information and the article information of the article indicated by the article code detected by the detection unit;

determining whether or not the weight measured by the weighing unit after the article code is detected by the detection unit is identical with the weight indicated by the weight information read out from the first storage unit;

storing the article information read out from the first storage unit into a second storage unit for storing article information of an article as a payment target, if it is determined that the weights are identical;

controlling the lighting unit so as to be turned off if it is determined that the weights are not identical; and turning off the lighting unit if the article code is detected by the detection unit and turning on lighting unit if it is determined that the weights are identical and turning off the lighting unit if it is determined the weights are not identical and if it is determined that weights are not identical, turning on the lighting unit in response to removal of the article related to the determination from the placing table, wherein the weight information includes identification information which identifies an article that is not a target of determination, and if the article is identified by the identification information included in the weight information read out as an article that is not a target of determination, the determination is not carried out using the weight information and the storing of the article information read out, together with the weight information in the second storage unit.

* * * * *